(12) United States Patent
Haimer et al.

(10) Patent No.: US 9,616,505 B2
(45) Date of Patent: Apr. 11, 2017

(54) MILLING CUTTER WITH A CORD OF A SPECIAL TOOTH PROFILE

(71) Applicant: Franz Haimer Maschinenbau KG, Hollenbach (DE)

(72) Inventors: Franz-Josef Haimer, Igenhausen (DE); Reinhold Sanhieter, Hohenwart (DE)

(73) Assignee: FRANZ HAIMER MASCHINENBAU KG, Hollenbach (DE)

( * ) Notice: Subject to any disclaimer, the term of this patent is extended or adjusted under 35 U.S.C. 154(b) by 154 days.

(21) Appl. No.: 14/487,993

(22) Filed: Sep. 16, 2014

(65) Prior Publication Data

US 2015/0078841 A1 Mar. 19, 2015

(30) Foreign Application Priority Data

Sep. 16, 2013 (DE) .............................. 102013015261

(51) Int. Cl.
*B23C 5/10* (2006.01)
*B23C 5/00* (2006.01)

(52) U.S. Cl.
CPC ............... *B23C 5/10* (2013.01); *B23C 5/003* (2013.01); *B23C 2210/0492* (2013.01); *B23C 2210/086* (2013.01); *B23C 2210/282* (2013.01); *B23C 2210/32* (2013.01); *B23C 2210/40* (2013.01); *B23C 2222/28* (2013.01); *Y10T 407/1948* (2015.01)

(58) Field of Classification Search
CPC ..... B23C 5/10; B23C 5/003; B23C 2210/086; B23C 2210/32; B23C 2222/28
See application file for complete search history.

(56) References Cited

U.S. PATENT DOCUMENTS

| RE26,544 E | 3/1969 | Castor, Sr. |
| 3,736,634 A | 6/1973 | Sonnie |
| 4,497,600 A | 2/1985 | Kishimoto |
| 4,721,421 A | 1/1988 | Klinger |
| 4,770,567 A | 9/1988 | Moriarty |
| 6,715,966 B2 | 4/2004 | Tsuzuki et al. |
| 7,544,021 B2 | 6/2009 | Flynn |
| 2010/0215447 A1* | 8/2010 | Davis ....................... B23C 5/10 407/115 |
| 2010/0226726 A1 | 9/2010 | Strasmann |
| 2014/0161546 A1 | 6/2014 | Shpigelman et al. |

FOREIGN PATENT DOCUMENTS

| DE | 3323442 A1 | 3/1984 |
| DE | 202006013594 U1 | 4/2007 |

(Continued)

*Primary Examiner* — Sunil K Singh
*Assistant Examiner* — Alan Snyder

(57) ABSTRACT

A milling cutter with at least one peripheral cutting edge 4 disposed on its periphery, the peripheral cutting edge 4 being configured as a profile of spaced-apart teeth 7 that forms a so-called "cord"; wherein each of the teeth 7—looking from the flute in a direction opposite to the cutting direction onto the cutting edge portion—forms a cutting edge portion SK composed of several different radii, i.e. of at least one larger radius R1 forming the predominant part of the cutting edge portion of the respective tooth 7 and a smaller radius R2, which is preferably immediately adjacent thereto on both sides.

8 Claims, 5 Drawing Sheets

(56) References Cited

FOREIGN PATENT DOCUMENTS

| DE | 102009002738 A1 | 9/2010 |
|---|---|---|
| EP | 0062693 A1 | 10/1982 |
| EP | 2436467 A1 | 4/2012 |
| JP | S60118412 A | 6/1985 |
| WO | 2008028462 A1 | 3/2008 |

* cited by examiner

MILLING CUTTER WITH A CORD OF A SPECIAL TOOTH PROFILE

FIELD OF THE INVENTION

The invention relates to a milling cutter with at least one peripheral cutting edge and preferably a helically toothed or spiral end-milling cutter. The latter milling cutters cut both on their periphery as well as on their front.

BACKGROUND OF THE INVENTION

Where such milling cutters are used as roughing cutters, their peripheral cutting edge is frequently provided with an interrupted tooth profile, the so-called "cord". In addition, a specially formed flute is frequently provided on the cutting surface which, however, is of only minor importance within the context of this invention.

The purpose of the cord is to influence the cutting edge length, the chip formation and the cutting force in such a way that they are advantageous for roughing by the chip receiving an optimum width, whereby it breaks quickly and can then be conveyed away without any problems despite the high chip removal rate. Very narrow chips, for example, break relatively poorly and tend to form long strands. Wide chips, such as they are produced by tools with a continuous cutting edge, also break poorly due to their high strength and require very high cutting forces. The fact that tools with divided cutting edges obtain poorer surface qualities is deliberately accepted so far.

Such roughing cutters with a cord are thus particularly suitable for use in so-called HPC (high performance cutting), in which particularly large chip removal rates are realized.

Roughing cutters with cords have been used for a long time and have so far shown very good suitability for everyday use, which did not give any particular cause for complaints.

If the chip removal rates are increased significantly by fully exploiting the capacity limit of the cutting tool, it is suddenly evident in the known roughing cutters with cords that the peripheral cutting edges may break out where they are provided with the tooth profile forming the cord. This shortens the life span of the tool. In particular, this problem arises in the case of solid-carbide tools, whose cutting edges reach such long life spans, even with the high stresses of high-performance chip removal, that failures of the tooth profile forming the cord due to break-outs occur to an, in part, significant extent even though the cutting edges as such would still be sufficiently sharp.

It is therefore the object of the invention to provide a milling cutter with a profile forming the cord that is more durable.

SUMMARY OF THE INVENTION

The milling cutter according to the invention has at least one and preferably several peripheral cutting edges disposed on its periphery. In this case, each peripheral cutting edge is generally configured as a profile comprised of teeth spaced apart in the cutting direction, which forms a so-called "cord". According to the invention, each of the teeth—looking from the flute in the circumferential direction onto the cutting edge portion—forms a cutting edge portion composed of several different radii, i.e. of at least one larger radius R1 forming the predominant part of the cutting edge portion on the respective tooth and a smaller radius R2, which is preferably immediately adjacent thereto on both sides.

In this case, each of the aforementioned radii is part of the cutting edge portion, i.e. participates in chip removal. The region of the groove between two teeth that does not participate in chip removal—even if it is rounded off in some way—forms no radius that would be relevant in the sense of the invention.

Such a configuration appears to be disadvantageous at first sight, for it requires a higher cutting force.

Upon closer inspection, however, it becomes clear that the composition of the cutting edge portion from several distinctly different radii attains a decisively better heat distribution despite the higher cutting forces, which results in an increase of the edge stability to an unexpected extent.

This may be connected with the fact that the absolute size of the large radius of a tooth becomes relative. This radius has a not inconsiderable size if one looks on the cutting edge portion in a perpendicular direction to the helix angle. However, if one looks on the cutting edge portion in the circumferential direction, in a direction opposite to the cutting direction, the tooth width appears foreshortened due to the helix angle. Therefore, the large radius has less of a disadvantageous effect than appears at first, so that its positive effects prevail. That is why the cutting force is actually smaller than the large radius would suggest.

Within the context of a preferred exemplary embodiment, it is provided that the following applies for the size of the larger radius and the smaller radius relative to each other: $R1/R2 \geq 10$, and preferably $R1/R2 \geq 15$. In this way, the larger radius forms a pronounced plateau that exhibits a very good chip removal. In this case, the small radius that is preferably adjacent to both sides of the plateau renders the transitions towards the groove separating the two adjacent teeth exceptionally resistant, so that the break-out that is to be feared especially in this region is considerably contained in comparison to what is known from the prior art.

Preferably, a steep flank extending at an angle $\beta$ to the imaginary center line of the respective tooth which is configured to be $\leq 30°$, and ideally even $\leq 18°$, is in each case adjacent to the smaller radii on the side thereof facing away from the plateau. Surprisingly, and for reasons that have so far not yet been investigated in detail, practical tests show that such a steep flank—compared with the considerably shallower tooth flanks known so far—contributes in a substantial degree to the prolonged durability.

Preferably, the milling cutter is configured in such a way that the steep flank transitions into a bottom of a groove which is concave and ideally provided with a substantially constant radius.

The reason has not yet been explained for the surprising discovery that the milling cutter exhibits a substantially better operating life if two teeth that are adjacent along a main cutting edge portion are separated from each other only by narrower grooves than were used so far in the prior art—i.e. grooves for whose widths ZB (tooth width) and NB (groove width) the following applies: $NB/ZB \leq 0.5$ or even $\leq 0.3$. Preferably, this relation applies to all grooves of the cord, wherein individual grooves, for example at the beginning or the end of a peripheral cutting edge or within the context of patent law-related attempts at circumvention, may possibly be excepted.

Preferably, the milling cutter according to the invention is configured in such a way that two teeth, respectively, which are adjacent along a main cutting edge portion, are separated by grooves for which it applies that the value of the maximum groove depth substantially is less than or equal to the value of the maximum groove width.

The invention is particularly useful to use in the case of solid-carbide milling cutters.

The following description of an exemplary embodiment and its differences to the prior art known so far makes clear other modes of operation, advantages and configuration options.

DETAILED DESCRIPTION OF THE PREFERRED EMBODIMENTS

Figure 1:
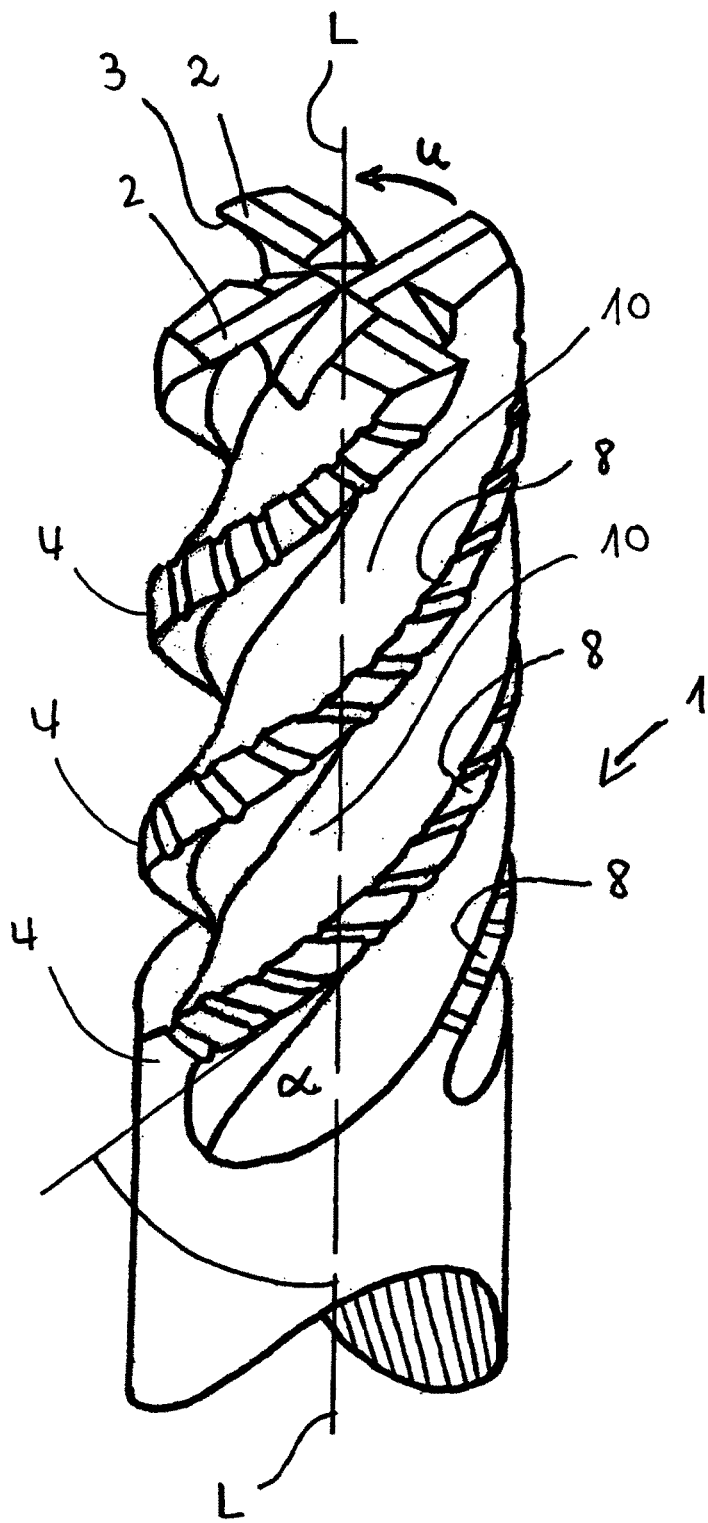
FIG. 1 shows an end-milling cutter according to the invention, wherein the exact toothing geometry cannot be seen in this drawing, but the arrangement in principle of the individual teeth that form a cord here can be seen.

FIG. 1 shows a milling cutter 1 according to the invention in the form of an end-milling cutter with a cord, wherein, however, the decisive differences in which the profile of the cord according to the invention differs from the prior art are not apparent from FIG. 1 due to its small scale.

The end-milling cutter is right-hand cutting, which is visualized by the arrow U. However, the invention is also applicable to left-hand cutting milling cutters. The end-milling cutter is preferably made from solid carbide from the cutting edges up to and including the shank.

Here, the front cutting edges 2 with their front cutting edge portions 3 are easily recognized. The milling cutter shown here is configured as a so-called "slotting" or "end-milling cutter", which is apparent from the fact that its front cutting edges in each case end shortly before the axis of rotation L of the milling cutter. Therefore, the material is merely displaced in the region of the longitudinal axis during insertion, which effects a reduced feed. However, the invention is not limited thereto, but preferably also encompasses so-called "groove milling cutters", whose front cutting edges have an extension extending beyond the axis of rotation L.

The peripheral cutting edges 4 with their peripheral cutting edge portions 5 and the main free surfaces 8 associated therewith are also easy to recognize. Flutes 10 that extend in a helical form just like the peripheral cutting edges 4 are provided between the peripheral cutting edges that follow each other in the operational direction of rotation U.

The helix angle α of the peripheral cutting edges 4 is preferably selected in such a way that a peripheral cutting edge disengages from the workpiece only when the next cutting edge is already cutting. However, the invention can also be applied to non-helical cutting edges and for cutting edges whose helix is opposite to the operational direction of rotation U.

The cord that can be seen as a whole in FIG. 1 is formed by each peripheral cutting edge being provided in the region of its cutting edge portion with a tooth profile as it will be described in more detail below. In this case, the individual teeth 7 of peripheral cutting edges 4 disposed immediately one behind the other in the circumferential direction are preferably disposed in such a way that, viewed in the circumferential direction, two teeth 7 are not disposed directly one behind the other; instead, the teeth 7 of successive peripheral cutting edges 2 are disposed offset with respect to each other in the direction of the axis of rotation L.

Figure 2:
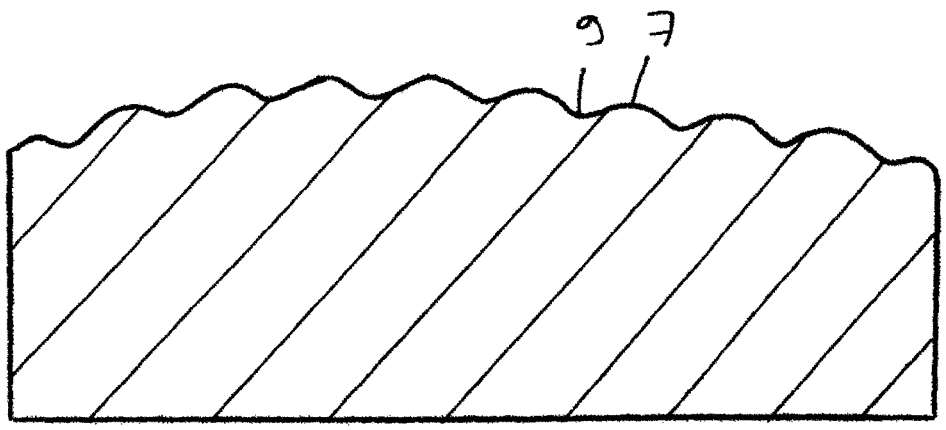
FIG. 2 shows a tooth profile known from the prior art, viewed from the flute 10 in an opposite direction to the cutting direction.

FIG. 2 shows a typical tooth profile of a cord known in the prior art in an enlarged view in a measuring projector.

In order to understand the invention, it is necessary to know that each tooth 7 removes a chip substantially only in the region of its tip, whereas the valleys between two adjacent teeth generally (if the proper feed is employed) do not actively participate in the actual removal of the chip themselves. This becomes comprehensible if one realizes that the engagement depth of each tooth (the so-called tooth feed) is in the range of tenths of millimeters, most frequently at 0.1 mm to 0.2 mm.

As can be seen, each individual tooth 7 in this case has a profile that is continuously convex on its outer edge and transitions into a concave course curved in the opposite direction only at the bottom of the valleys that the respective tooth forms together with the teeth that are adjacent to the left and to the right.

A cord formed by such tooth profiles as are shown in FIG. 2 forms comparatively small contact zones. However, the small contact zones have problems with regard to stability. The teeth forming the cord tend to break out quickly due to high thermal stresses. Chips formed by a cord profiled in this manner, although they are perceptibly narrower than the chips of a cutting edge without a cord, still tend to tangle to a certain extent, which results in a relatively poor removal of the chips. At the same time, the surface quality of the surface of the machined component becomes sub-optimal.

Figure 3:
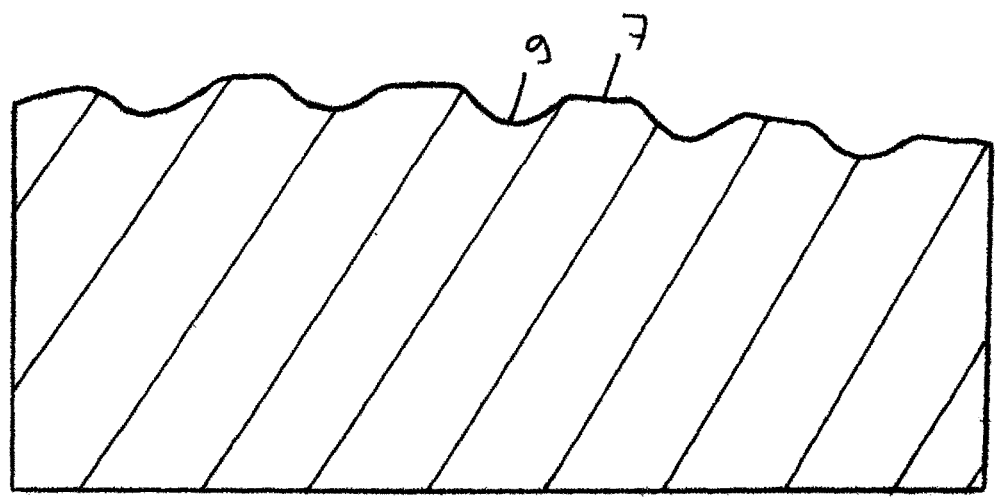
FIG. 3 shows an improved tooth profile known from the prior art, viewed from the flute 10 in an opposite direction to the cutting direction.

FIG. 3 shows another tooth profile of a cord known in the prior art in an enlarged view in a measuring projector.

As can be seen, each individual tooth of the cord in this case has a profile that has at its outer edge a significant straight section that transitions on both of its sides via a convex radius into the concave bottom of the valley, which is rather extensive in each case, and which the respective tooth forms with the adjacent tooth.

A good chip breakage is thus achieved, as well as a good surface quality, which is why this cord profile is so far considered an optimum solution among experts and has become so widespread in practice.

Figure 4:
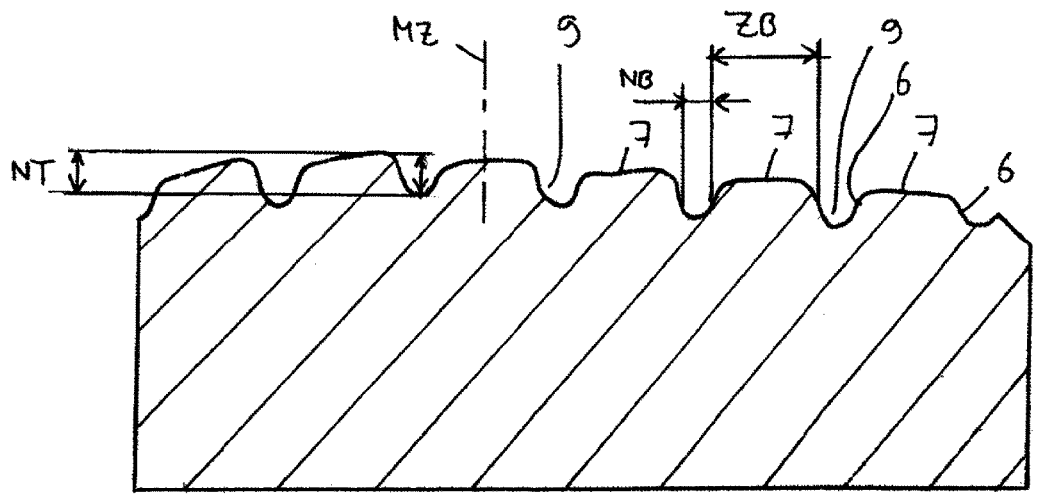
FIG. 4 shows an exemplary embodiment of the tooth profile according to the invention, viewed from the flute 10 in an opposite direction to the cutting direction.

FIG. 4 shows an exemplary embodiment of the tooth profile according to the invention, also seen in an enlargement of a measuring projector. FIG. 4, like FIGS. 2 and 3 before, also shows a view onto a peripheral cutting edge viewed from its flute 10.

Compared to the known tooth profile, the tooth profile of the cord according to the invention is characterized in that, when it is new, the cutting edge SK of a tooth that actively participates in chip removal is composed of several radii in the direction transverse or orthogonal to the cutting direction. The predominant part of the cutting edge is in this case formed from a larger radius R1 that is so large that it forms a plateau which is only slightly curved in the direction of the axis of rotation L of the milling cutter and takes up at least ⅔, and better still, ¾ of the tooth width ZB. Preferably, a smaller radius R2 is adjacent to this plateau on both sides, respectively. In this case, said radii R1 and R2, viewed from the outside of the circumference of the milling cutter, form outwardly curved surfaces.

However, the term "radius" encompasses only deliberately manufactured radii, and not those arbitrarily small radii that can be found at almost any magnification at almost every edge where two surfaces transition into each other abruptly, particularly if the edge is already worn. Preferably, only such deliberate "radii" are considered to be radii within the sense of the invention that have a radius of curvature RK of ≥0.1 mm.

Furthermore, the tooth profile according to the invention is additionally also characterized in that it is optimized with respect to a whole series of parameters that were so far paid only little attention amongst experts.

Figure 5:
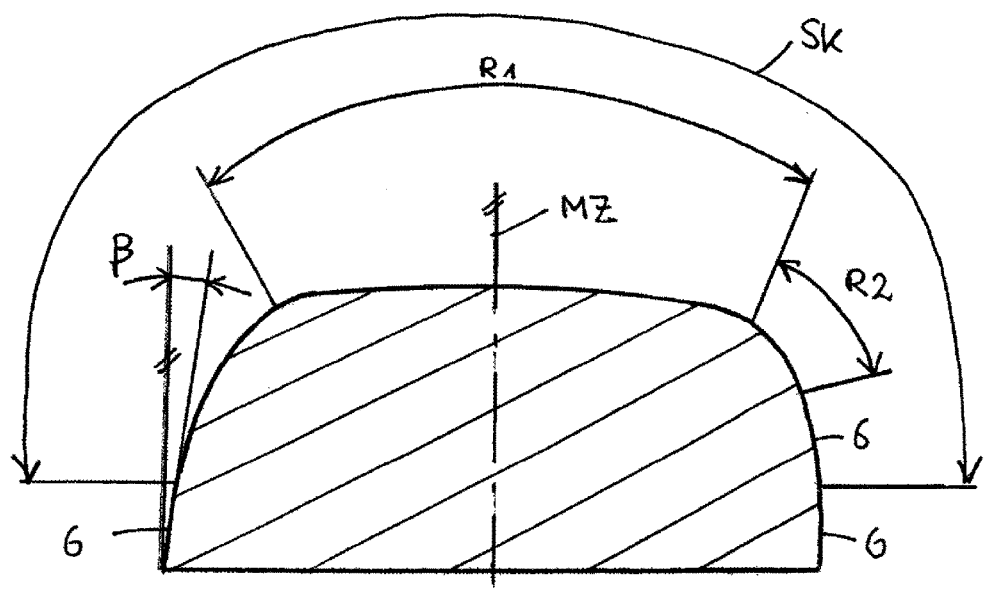
FIG. 5 shows an enlarged illustration of one of the teeth from FIG. 4.

If one looks again at a single tooth in accordance with FIG. 4 on an enlarged scale, the image shown by FIG. 5 presents itself. The plateau of each tooth has no plane profile, but instead is configured to be convex and preferably has a first radius of curvature R1. At the boundaries of the tooth, where the latter begins to transition into a groove forming a valley between it and the immediately adjacent tooth, the radius of curvature R1 transitions into a respectively smaller radius of curvature R2. Preferably, the following applies: R1/R2≥10 and better still ≥15. The radii of curvature R2 are preferably adjoined by a surface that can be referred to as the steep flank 6 of the respective tooth and which is preferably substantially straight. A part of the steep flank—preferably about ⅓ to maximally ½—is part of the cutting edge portion and therefore participates in chip removal, which explains that the presence of the steep flank also contributes to a positive effect. Between two adjacent teeth, this steep flank 6 transitions into a concave course of the profile forming the groove bottom between the two teeth.

As can be seen, the tooth profile according to the invention preferably differs from the tooth profiles known so far also by this steep flank, wherein the following preferably applies for the angle β at which the steep flank extends relative to the center line MZ of a tooth: β≤30°, and ideally β≤18°.

It is furthermore apparent from a comparison of FIGS. 2, 3 and 4 that the grooves between adjacent teeth are considerably larger in the tooth profiles from the prior art than in the tooth profile according to the invention. Preferably, the following relationship applies for the tooth profile according to the invention with regard to the tooth width ZB and the groove width NB: NB/ZB≤0.5, and preferably NB/ZB≤0.3.

Of course, it has to be taken into consideration that the depth of the grooves separating the individual teeth also has a considerably larger influence on chip formation than hitherto presumed. Preferably, the tooth profile according to the invention is configured in such a way that its groove depth NT substantially is less than or equal to its groove width NB, and/or that the following applies: ZB/NT≤3.5, or preferably ZB/NT≤5.

On the whole, the compliance with the total combination of the optimization measures results in deep, narrow and steeply dropping grooves that have a surprisingly positive influence on durability and chip formation.

Figure 6:
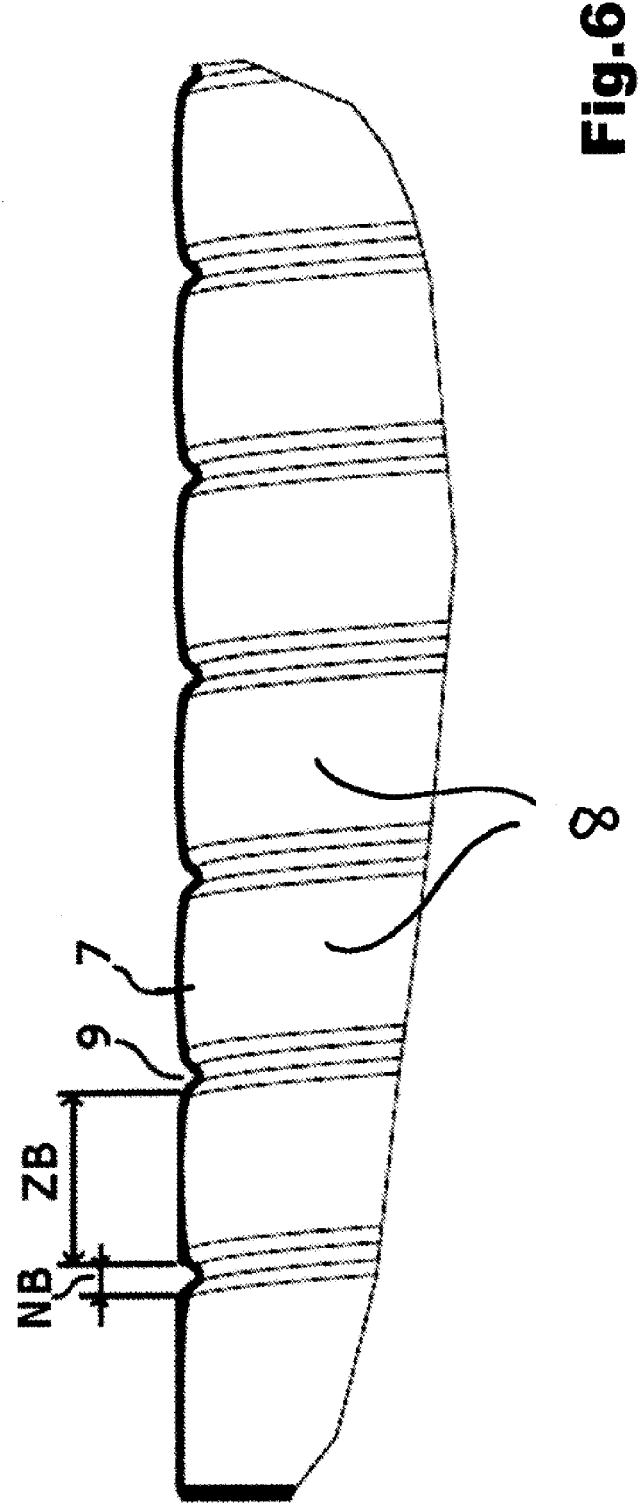
FIG. 6 shows a view onto a peripheral cutting edge viewed from the side facing away from the peripheral cutting edge portion.
Figure 7:
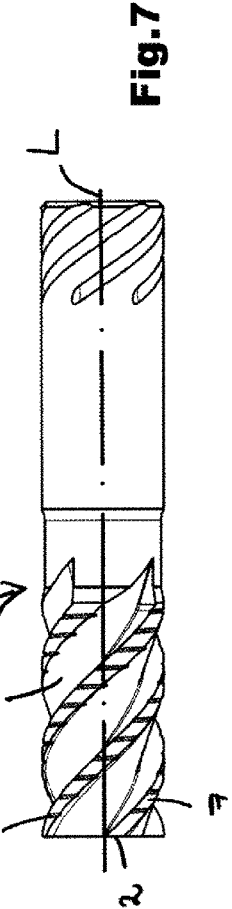
FIG. 7 once again shows a detailed overall view of the milling cutter serving as an exemplary embodiment here.

FIG. 1 already shows another very favorable, and therefore preferred, configuration option of the invention; even clearer in this regard is FIG. 6:

The cord profile only starts spaced from the front cutting edges. This spacing is produced by the first groove 9, which marks the beginning of a tooth 7, preferably being spaced by at least one tooth width ZB from the front cutting edge 2, into which the secondary cutting edge leads that belongs to this groove. The purpose of this is to avoid the incomplete teeth in the transition region between the front and peripheral cutting edges, which were hitherto regarded as being non-critical, because they have proved to be prone to fracturing to an unexpectedly large degree once the profile of the cord is configured in accordance with the invention. The incompleteness of these teeth 7 is in this case caused by the fact that the peripheral cutting edge 4 tapers in the transition region towards the front cutting edges 2 and the teeth 7 in that region are limited in their length and width. Preferably, the spacing of the first groove 9 that defines the first tooth 7 is in this case no more than three, ideally no more than two tooth widths ZB.

The cutting-edge geometry according to the invention has a particularly advantageous effect on solid-carbide milling cutters, i.e. hard metal milling cutters in which at least the front cutting edge portions and the peripheral cutting edge portions including the cords consist of hard metal. In the case of hard metal milling cutters, the entire milling cutter inclusive of its clamping shaft typically consists of hard metal.

In order to avoid unwanted vibrations and improve the surface quality, front cutting edges 2, viewed in the circumferential direction, are pitched in an uneven manner, i.e. they include at least two different angles between them. Preferably, this uneven pitch then continues between the peripheral cutting edges and is ideally enhanced by their differing pitch angles or helix angles α1, α2, wherein an even pitch preferably may be caused in one plane of the milling cutter by the different pitch angles, i.e. that in this plane, the peripheral cutting edges 4 are each disposed with the same spacing from one another, viewed in the circumferential direction. The uneven pitch avoids the occurrence, due to cutting edges that enter and come out of the workpiece in a rapidliy alternating manner, of force impacts at regular intervals, which have an increased tendency to excite vibrations due to their regularity.

Figure 8:
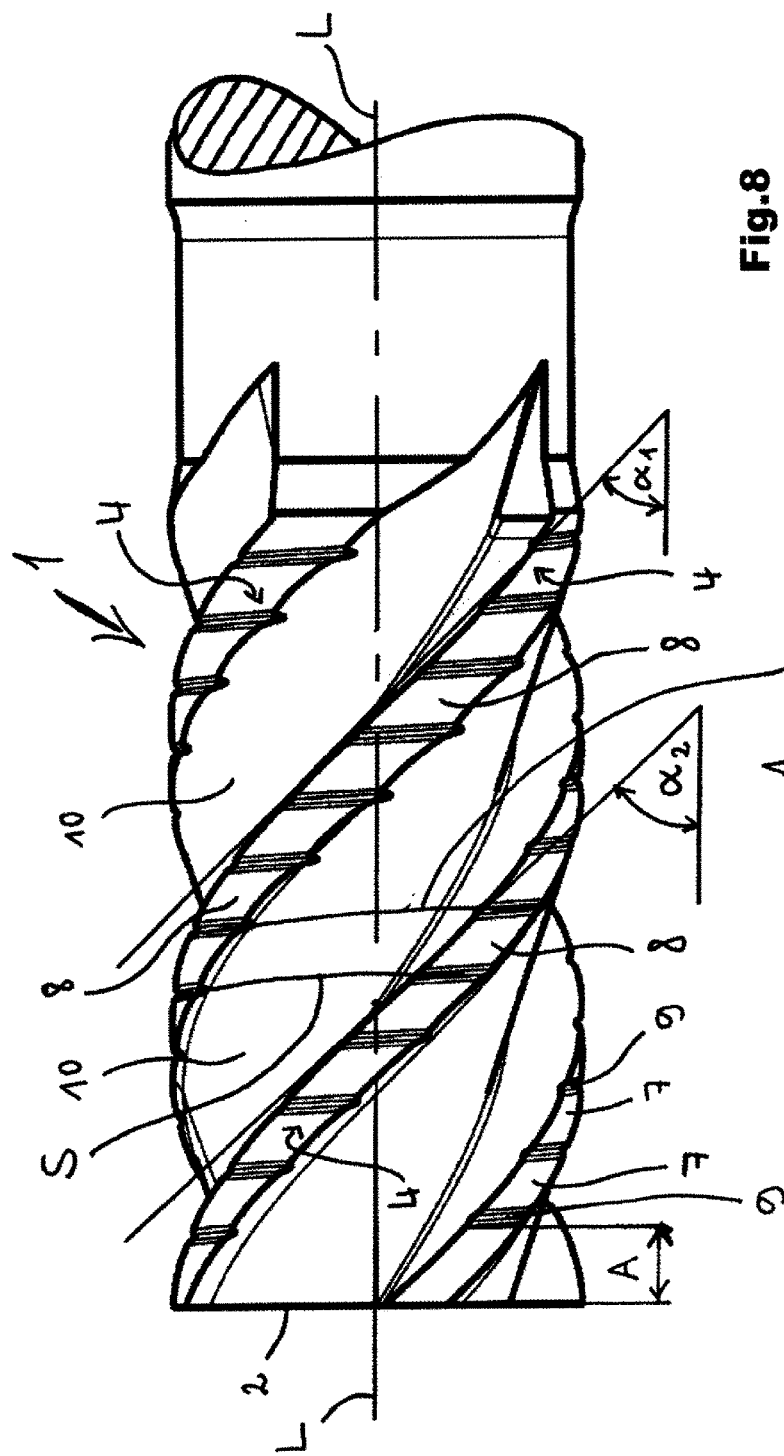
FIG. 8 once again shows a detailed overall view of the cutting edges and, in particular, of the peripheral cutting edges of the milling cutter serving as an exemplary embodiment here.

Moreover, the grooves 9 may also be offset relative to each other on the peripheral cutting edges 4 along the axis of rotation L, preferably by the factor 1/n, with n corresponding to the number of constantly spaced peripheral cutting edges 4. Where the peripheral cutting edges 4 are not disposed with a constant spacing, the grooves 9 are preferably disposed offset relative to each other on their peripheral cutting edges 4 in such a way, that they are, on the whole, disposed along an imaginary helical line S, see FIG. 8 in which two of the imaginary helical lines S are drawn in. In many cases, the respective helical line has a continuously constant pitch from start to end, and thus determines the positioning of the grooves. For some applications, however, it has proven to be particularly advantageous if the imaginary helical line has a variable pitch.

In an alternative embodiment, every second peripheral cutting edge can be configured as a finishing cutting edge, i.e. without a cord, without a division into teeth and grooves, whereby a so-called roughing/finishing milling cutter is produced.

Within the context of this invention, the term "hard metal" is understood to mean sintered carbide hard metals as well as the so-called "cermets", which are carbide-free sintered materials.

Surprisingly, however, it was found that milling cutters consisting of the conventional high-speed and tool steels can also be improved considerably by means of this invention.

For the sake of completeness, it must be emphasized that, of course, not only can end-milling cutters be decisively improved with the invention, but also all others types of milling cutters, in particular threaded milling heads that are expediently equipped with a cord.

Finally, it is noted that protection is also sought for the following embodiment:

A milling cutter with at least one peripheral cutting edge 4 disposed on its periphery, the peripheral cutting edge 4 being configured as a profile of spaced-apart teeth 7 that forms a so-called "cord"; characterized in that each of the teeth 7—looking from the flute in the circumferential direction onto the cutting edge portion—forms a cutting edge portion SK composed of at least two different radii, i.e. of at least one larger radius R1 forming the predominant part of the cutting edge portion of the respective tooth 7 and at least one smaller radius R2, which is immediately adjacent thereto.

For the sake of completeness, it is noted that, in order to realize the invention, a constant large radius R1 and a constant small radius R2 are preferably used, which directly transition into each other, with the small radius R2 that is adjacent to the large radius R1 on one side does not necessarily have the same value as the smaller radius R2 that is adjacent on the other side.

Protection is preferably also sought for a cutting edge portion which consists, inter alia, of locally different large radii $R1_{(1,2\ to\ x)}$, which replace the arc otherwise formed by the single constant large radius R1, and/or which consists, inter alia, of small radii $R2_{(1,\ 2\ to\ y)}$ of a locally different size, which replace the arc otherwise formed by a constant small radius R2. The term of the smaller radius R1 and the larger radius R2 is to be construed accordingly.

The invention claimed is:

1. A milling cutter, comprising:
   at least one peripheral cutting edge disposed on a periphery of the milling cutter, the peripheral cutting edge being configured as a profile of spaced-apart teeth separated by grooves, wherein each of the teeth—as viewed from a flute portion of the milling cutter in a direction opposite a cutting direction onto a cutting edge portion—forms the cutting edge portion composed of a plurality of different radii, with at least one larger radius (R1) forming a predominant part of the cutting edge portion of the respective tooth and a smaller radius (R2), which is immediately adjacent to the predominant part of the cutting edge portion and positioned on both sides of the predominant part of the cutting edge portion;
   wherein two teeth, respectively, that are adjacent along a main cutting edge portion are separated from each other only by narrow grooves, for whose widths, a tooth width (ZB) and a groove width (NB), the following relationship applies: NB/ZB≤0.5; and
   a relationship between the tooth width (ZB) and a groove depth (NT) is ZB/NT≤3.5.

2. The milling cutter according to claim 1, wherein a groove, which is closest to a front cutting edge of a peripheral cutting edge leading into the front cutting edge, has a spacing from said front cutting edge that amounts to at least one tooth width (ZB).

3. The milling cutter according to claim 2, wherein the spacing is no more than three tooth widths (ZB).

4. The milling cutter according to claim 1, wherein the following relationship applies for the size of the larger radius (R1) and the smaller radius (R2) relative to each other: R1/R2≥10.

5. The milling cutter according to claim 1, further comprising a steep flank extending at an angle (β) to a center line of a respective tooth which is ≤30°, and adjacent to the smaller radii (R2).

6. The milling cutter according to claim 5, wherein the steep flank transitions into a concave bottom of a groove.

7. The milling cutter according to claim 1, wherein two teeth, respectively, that are adjacent along a main cutting edge portion are separated by grooves, and a value of a maximum groove depth is less than or equal to a value of a maximum groove width.

8. The milling cutter according to claim 1, wherein the milling cutter is a solid-carbide milling cutter.

* * * * *